(12) United States Patent
Barkai et al.

(10) Patent No.: US 9,857,099 B2
(45) Date of Patent: Jan. 2, 2018

(54) SOLAR ENERGY ABSORPTIVE COATING, ARRANGEMENT OF THE COATING ON A SUBSTRATE, METHOD FOR MANUFACTURING THE ARRANGEMENT AND USE OF THE ARRANGEMENT

(71) Applicant: SIEMENS CONCENTRATED SOLAR POWER LTD., Rosh Ha ayin (IL)

(72) Inventors: Menashe Barkai, Tel Aviv (IL); Alexander Gette, Jerusalem (IL)

(73) Assignee: SIEMENS CONCENTRATED SOLAR POWER LTD., Rosh Ha Ayin (IL)

( * ) Notice: Subject to any disclaimer, the term of this patent is extended or adjusted under 35 U.S.C. 154(b) by 0 days.

(21) Appl. No.: 15/150,801

(22) Filed: May 10, 2016

(65) Prior Publication Data

US 2016/0252274 A1    Sep. 1, 2016

Related U.S. Application Data

(62) Division of application No. 13/884,009, filed as application No. PCT/EP2010/067831 on Nov. 19, 2010, now abandoned.

(51) Int. Cl.
*G06K 7/10*     (2006.01)
*F24J 2/46*     (2006.01)
(Continued)

(52) U.S. Cl.
CPC .............. *F24J 2/4652* (2013.01); *C09D 5/32* (2013.01); *F24J 2/485* (2013.01); *Y02E 10/40* (2013.01)

(58) Field of Classification Search
CPC .. G02B 1/00; G02B 1/11; G02B 1/113; G02B 1/115; G02B 1/116; G02B 5/003; G02B 5/22; G02B 5/208; G02B 5/28; G02B 5/281; G02B 5/282; G02B 5/285; G02B 5/286; Y02E 10/40; Y02E 10/41;
(Continued)

(56) References Cited

U.S. PATENT DOCUMENTS 4,960,310 A * 10/1990 Cushing .................. G02B 5/28
                                                    359/360
2003/0026014 A1* 2/2003 Kunii .................. C23C 14/0688
                                                    359/888
(Continued)

*Primary Examiner* — Arnel C Lavarias

(57) ABSTRACT

A solar energy absorptive coating for absorbing sunlight energy includes a multilayer stack, including a first absorbing layer with first absorbing layer material for absorbing an absorption radiation of a certain spectrum of the sunlight, a transmission dielectric layer with a transmission dielectric layer material for a transmission of the absorption radiation, and a second absorbing layer with a second absorbing layer material for absorbing the absorption radiation, wherein at least one of the absorbing layer materials has an absorbing layer material refractive index for the absorption radiation, between 1.5 and 4.0, and an absorbing layer material extinction coefficient for the absorption radiation, between 0.8 and 3.0, and the transmission dielectric layer material has a dielectric layer material refractive index for the absorption radiation, between 1.0 and 3.0, and a dielectric layer material extinction coefficient for the absorption radiation, between 0.0 and 0.2.

2 Claims, 2 Drawing Sheets

(51) Int. Cl.
*C09D 5/32* (2006.01)
*F24J 2/48* (2006.01)

(58) Field of Classification Search
CPC ......... Y02E 10/42; Y02E 10/44; Y02E 10/45;
F21S 11/00; F21S 11/002; F21S 11/005;
F24J 2/0015; F24J 2/10; F24J 2002/1071;
F24J 2/4652; F24J 2/4654; F24J
2002/4683; F24J 2002/4685; F24J 2/481;
F24J 2/484; F24J 2/485; F24J 2/487
USPC ....... 359/350, 359, 360, 577, 580, 582, 585,
359/586, 588, 589, 590, 885, 889, 888,
359/890, 892; 353/3; 126/681, 682, 683,
126/684, 685, 686, 687, 688, 689, 690,
126/691, 692, 693, 694, 695, 696, 697
See application file for complete search history.

(56) References Cited

U.S. PATENT DOCUMENTS

2006/0061867 A1* 3/2006 Kunii .................. G02B 5/205
359/601
2006/0279866 A1* 12/2006 Kunii .................. G02B 5/22
359/888

* cited by examiner

SOLAR ENERGY ABSORPTIVE COATING, ARRANGEMENT OF THE COATING ON A SUBSTRATE, METHOD FOR MANUFACTURING THE ARRANGEMENT AND USE OF THE ARRANGEMENT

CROSS REFERENCE TO RELATED APPLICATIONS

This application is a divisional of U.S. Ser. No. 13/884,009 filed on May 8, 2013 which is the US National Stage of International Application No. PCT/EP2010/067831 filed Nov. 19, 2010 and claims benefit thereof, the entire content of which is hereby incorporated herein by reference.

BACKGROUND OF THE INVENTION

1. Field of the Invention

This invention relates to a solar energy absorptive coating for absorbing sunlight energy, an arrangement of the coating on a substrate surface of a substrate and a method for manufacturing the arrangement. Moreover a use of the arrangement is provided.

2. Description of the Related Art

A sun energy collecting unit of a sun field power plant based on the concentrated solar power technique comprises for instance a trough with parabolic mirrors and a heat receiver tube. The heat receiver tube is arranged in a focal line of the mirrors. By the mirrors the sunlight is focused to the heat receiver tube, which is filled with a heat transfer fluid, e.g. a thermo-oil. Via the heat receiver tube the energy of the sunlight is coupled into the heat transfer fluid. Solar energy is converted to thermal energy.

In order to maximize an efficiency, with which the energy of the sunlight is coupled into the heat transfer fluid, a solar energy absorptive coating is attached on a surface of the heat receiver tube. Such an absorptive coating commonly comprises a multilayer stack with sequentially deposited thin film layers having different optical characteristics.

An essential overall optical characteristic of the absorptive coating is a high solar absorbance (low solar reflectivity) for wavelengths of solar spectrum (absorption radiation). Additionally a low emissivity (high reflectivity) for infrared radiation is advantageous.

An absorptive coating with absorbing layers having absorbing layer materials is known from U.S. Pat. No. 5,523,132. The absorbing layers comprise cermet as absorbing layer materials. The cermet is a composite material with at least two physical phases. One phase is formed by at least one composite matrix material which is a dielectric material. A second phase is formed by at least one kind of metal particles. The amount of the metal particles distributed within the composite matrix material is given by the filling factor (F.F.). An extinction coefficient of the absorbing layer material increases with the filling factor of the metal particles. As a consequence the absorbance of the absorbing layer increases with the increasing of the filling factor, too (a layer thickness of the absorbing layer is the same). Additionally these absorbing layers are transparent or nearly transparent for electromagnetic waves of the infrared region.

SUMMARY OF THE INVENTION

It is an object of the invention to provide an efficient absorptive coating for solar energy. The coating should have a high solar absorbance for sunlight and a low emissivity for infrared radiation. These optical characteristics should be fulfilled at high temperatures of 300° C.-500° C. and more.

It is another object of the invention to provide an arrangement with the solar energy adsorptive coating.

Further objects of the invention are a method for manufacturing the arrangement and a use of the arrangement.

These objects are achieved by the inventions specified in the claims.

A solar energy absorptive coating for absorbing sunlight energy is disclosed, wherein the coating comprises a multilayer stack with following stacking sequence: At least one first absorbing layer with at least one first absorbing layer material for absorbing an absorption radiation of a certain spectrum of the sunlight; at least one transmission dielectric layer with at least one transmission dielectric layer material for a transmission of the absorption radiation; and at least one second absorbing layer with at least one second absorbing layer material for absorbing the absorption radiation; wherein at least one of the absorbing layer materials has an absorbing layer material refractive index $n_a$ for the absorption radiation, which is selected from the range between 1.5 and 4.0, and an absorbing layer material extinction coefficient $k_a$ for the absorption radiation, which is selected from the range between 0.8 and 3.0; and the transmission dielectric layer material has a dielectric layer material refractive index $n_d$ for the absorption radiation, which is selected from the range between 1.0 and 3.0, and a dielectric layer material extinction coefficient $k_d$ for the absorption radiation, which is selected from the range between 0.0 and 0.2. The certain spectrum of the sunlight ranges from 350 nm to 2500 nm. A relation of the optical characteristics (absorbance A and transmission T) of each of the layers are given by the equation $A=1-T$. By the multilayer stack with the described stack sequence the sunlight is efficiently coupled into the multilayer stack and trapped within the multi layer stack.

Beside the solar energy absorptive coating an arrangement of the solar energy absorptive coating on a substrate surface of a substrate is disclosed, wherein one of the absorbing layers is attached to the substrate surface. This absorbing layer is preferably directly attached to the substrate surface. The substrate surface preferably comprises an infrared light reflecting surface. For instance the infrared light reflecting surface is implemented by a thin layer with Copper (200 nm) on a body, e.g. a heat receiver tube. Other metals like Silver or Aluminium or alloys of the metals are also possible.

In a further preferred embodiment an anti reflective coating for the sunlight is attached on a side of the multilayer stack, which is averted to the substrate surface of the substrate. By this the loss of sunlight for the coupling into the heat transfer fluid is reduced. Nearly all sunlight reaches the optically active adsorptive coating. The anti reflective coating comprises for instance Aluminium Oxide or Silicon Oxide. Other materials or a mixture of different materials is possible, too. A thickness of the anti reflective coating is selected from the range between 30 nm and 200 nm and preferably selected from the range between 60 nm and 120 nm.

In a preferred embodiment the substrate is a part of a receiver tube of a power plant for converting solar energy into electrical energy. The receiver tube can carry a heat transfer liquid. The absorbed solar energy (sunlight) is converted into thermal energy of the heat transfer fluid. With the aid of the absorptive coating the energy of the sunlight is efficiently coupled into the heat transfer liquid.

In order to solve the problems additionally a method for manufacturing the arrangement is provided, comprising following steps: a) providing the substrate with the substrate surface and b) attaching the multilayer stack on the substrate surface of the substrate. For the attaching the multilayer stack on the substrate surface of the substrate a thin film deposition technique is preferably used. The thin film deposition technique is selected from the group consisting of atomic layer deposition, chemical vapor deposition and physical vapor deposition. In a preferred embodiment a sputtering is used as the physical vapor deposition. The sputtering can by a RF sputtering method. The sputtering is preferably carried out by the aid of a DC power supply. A DC sputtering is possible for metal containing targets. For electrically insulating targets RF sputtering is used.

Finally a use of the arrangement in a sun field power plant for converting solar energy into electrical energy is described, wherein an absorbing of the sunlight energy is carried out with the aid of the arrangement. For instance the substrate of the arrangement is formed by a heat receiver tube of a solar collecting unit of a sun field power plant. The heat receiver tube is arranged in a focal line of the parabolic mirrors of a trough. By the mirrors the sunlight is focused to the heat receiver tube, which is filled with a heat transfer fluid. The heat transfer fluid is a thermo-oil or a melted thermo-salt. Via the heat receiver tube the energy of the sunlight is coupled into the heat transfer fluid. Due to the solar energy adsorptive coating on the surface of the heat receiver tube the solar energy is efficiently coupled into the heat transfer fluid.

The multilayer stack has anew layer profile of the absorptive coating. Thereby the layers are directly attached to one another. Adjacent layers of the stack cover each other at least partially. In particular a layer covers the subjacent layer completely.

The individual absorbing layers absorb the absorption radiation. In contrast to that the transmission dielectric layer is transparent or nearly transparent for the absorption radiation. The stacking of these layers leads to a very efficient absorptive coating with overall good optical characteristics for the application in a sun field power plant. At temperatures of more than 300° C. the absorptive coating absorbs nearly all the sunlight radiation. In addition the emissivity for infrared radiation at these high temperatures is very low. As a result, the absorbed energy can almost completely be transferred to the heat transfer liquid.

The multilayer stack can consist of only these three layers. But it is advantageous to stack more than these three layers. This leads to a higher selectivity of the absorptive coating. Therefore, in a preferred embodiment the multi layer stack comprises at least one further transmission dielectric layer with a further transmission dielectric layer material, wherein the further transmission dielectric layer material has a further dielectric layer material refractive index $n_{df}$ for the absorption radiation, which is selected from the range between 1.0 and 3.0, and a further dielectric layer material extinction coefficient $k_{df}$ for the absorption radiation, which is selected from the range between 0.0 and 0.2; and the further transmission dielectric layer is directly attached to one of the absorbing layers such, that this absorbing layer is arranged between the transmission dielectric layer and the further transmission dielectric layer.

In a further preferred embodiment the multi layer stack comprises additionally at least one further absorbing layer with at least one further absorbing layer material, wherein the further absorbing layer material has a further absorbing layer material refractive index $n_{af}$ for the absorption radiation, which is selected from the range between 1.5 and 4.0, and a further absorbing layer material extinction coefficient $k_{af}$ for the absorption radiation, which is selected from the range between 0.8 and 3.0; and the further absorbing layer is directly attached to the further transmission dielectric layer such, that the further transmission dielectric layer is arranged between the first absorbing layer and the further absorbing layer, or the further absorbing layer is directly attached to the further transmission dielectric layer such, that the further transmission dielectric layer is arranged between the second absorbing layer and the further absorbing layer. As a result of the described alternatives, absorbing layers and dielectric layers are alternately stacked.

In a preferred embodiment at least one of the absorbing layer materials is a cermet. Thereby to or more absorbing layers can comprise cermets. A cermet comprises a composite having a composite matrix with at least one dielectric matrix material and metal particles with at least one metal, wherein the metal particles are distributed in the composite matrix. The dielectric matrix material is preferably selected from the group consisting of Aluminium Oxide ($Al_2O_3$), Silicon Oxide ($SiO_2$), Titanium Oxide ($TiO_2$) and Zirconium Oxide ($ZrO_2$). Other materials are possible, too. The cermet matrix materials of the different absorbing layers can be the same. But different matrix materials of the absorbing layers are possible, too.

Aluminium Oxide is a transparent material and can be used as transmission dielectric layer material or as further transmission dielectric material. In general, the dielectric matrix materials of the absorbing layers can be used as transmission dielectric layer materials. This has the advantage, that the probability for the occurrence of thermal stress due to different thermal expansion coefficients is reduced. Therefore, preferably the transmission dielectric layer material is selected from the group consisting of Aluminium Oxide, Silicon Oxide, Titanium Oxide and Zirconium Oxide. It is advantageous, that these materials are the same materials, but it is not necessary, that the dielectric matrix materials and the transmission dielectric layer materials are the same materials.

For the absorbance of the absorbing layers the content of metal particles is decisive. The metal particles lead to a high absorbance. In a preferred embodiment the metal is selected from the group consisting of Molybdenum, Tantalum and Wolfram. Other metals like Copper, Platinum and Silver or metal alloys of metals are possible, too. The absorbing layer materials of the different absorbing layers can comprise metal particles with the same metal or metal alloy. But different metals or metal alloys are possible, too.

The higher a filling factor (metallic volume fraction per total volume) the higher the absorbance. In a preferred embodiment a metal content of the metal particles in the composite is selected from the range between 25 vol. % and 50 vol. % and preferably selected from the range between 30 vol. % and 45 vol. %.

Higher or lower fractions are possible, too. Thereby the filling factors of the different absorbing layer materials can be identical or nearly identical. But different filling factors are possible, too.

Additionally the thicknesses of the layers are important for the optical characteristics of the individual layers and therefore important for the overall optical characteristics of the adsorptive coating. In a preferred embodiment at least one of the absorbing layers comprises a absorbing layer thickness selected from the range between 1 nm and 100 nm and particularly selected from the range between 5 nm and 50 nm. The absorbing layers can have the same absorbing layer thicknesses. But in a preferred embodiment the absorbing layer thicknesses differ. By this the overall optical characteristics of the adsorptive coating are optimized. In particular the absorbing layer thickness of at least one of the absorbing layers is selected from the range between 5 nm and 30 nm and the absorbing layer thickness of at least another one of the absorbing layers is selected from the range between 30 nm and 50 nm.

BRIEF DESCRIPTION OF THE DRAWINGS

Further features and advantages of the invention are produced from the description of exemplary embodiments with reference to the drawing.

DETAILED DESCRIPTION OF THE INVENTION

Figure 1:
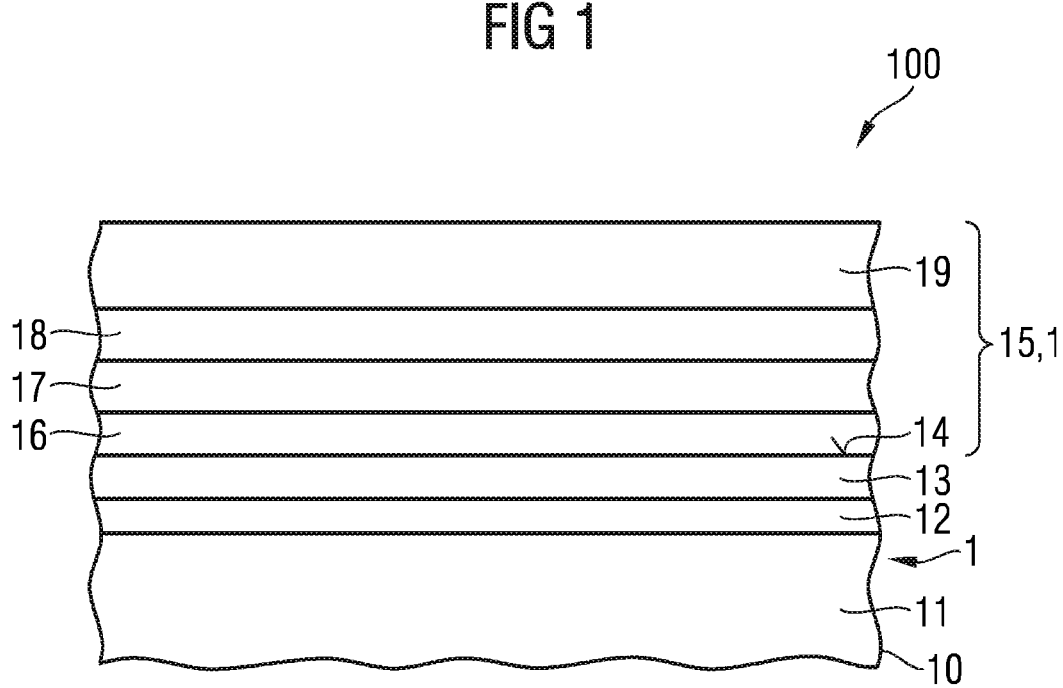
FIG. 1 shows a cross section of a example of an arrangement of the solar energy absorptive coating on a substrate surface of a substrate.
Figure 2:
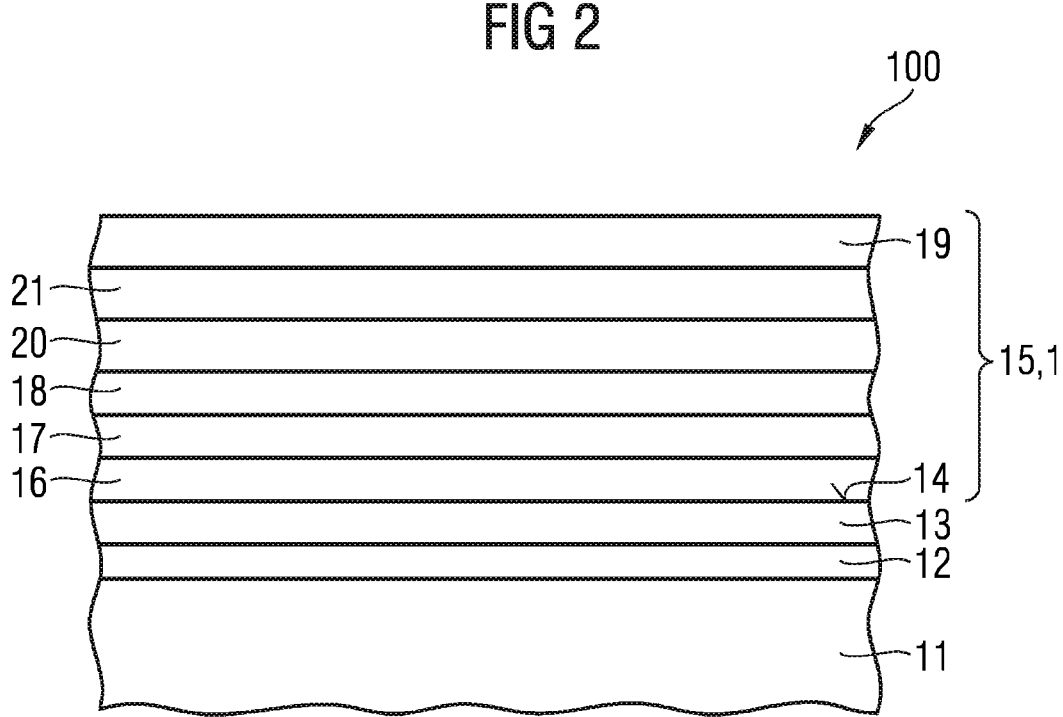
FIG. 2 shows a cross section of a second example of an arrangement of the solar energy absorptive coating on a substrate surface of a substrate.

Given is an arrangement 100 of a solar energy absorptive coating 1 on a substrate surface 14 of a substrate. The substrate is formed by a heat receiver tube 10. Inside the heat receiver tube a heat transfer fluid 11 can be arranged. The heat transfer fluid is a thermo-oil. In another embodiment the heat transfer fluid is a molten salt.

The heat receiver tube is coated with a diffusion barrier layer 12 and an infrared light reflecting layer 13. The infrared light reflecting layer has a thickness of about 200 nm and consists of Copper. The diffusion barrier layer 12 comprises Silicon Oxide or Aluminium Oxide. The thickness of the diffusion barrier layer amounts about 100 nm. The diffusion barrier layer, which is arranged between the wall of the heat receiver tube and the infrared light reflecting layer, stops the diffusion of Copper of the infrared light reflecting layer 13 into the wall of the heat receiver tube.

The infrared light reflecting layer 13 forms the substrate surface 14 on which the solar energy absorptive coating 15 is attached to.

Example 1

The solar energy absorptive coating for absorbing sunlight energy comprises a multilayer stack 15 with following stacking sequence: One first absorbing layer 16 with a first absorbing layer material, a transmission dielectric layer 17 with a transmission dielectric material and a second absorbing layer 18 with a second absorbing layer material. The absorbing layer materials are cermets. By that a "CDC" profile is given.

The first absorbing layer 16 has first absorbing layer thickness of about 30 nm. The second absorbing layer 18 has second absorbing layer thickness of about 5 nm.

The filling factor of the first absorbing layer (first cermet layer) amounts about 45%. The first absorbing layer material refractive index $n_a$ for the absorption radiation ranges from 1.5 to 4.0. The first absorbing layer material extinction coefficient $k_a$ for the absorption radiation ranges between 1.0 and 1.5. The second absorbing layer material has the same optical characteristics. Concerning alternative embodiments the characteristics of the first and the second absorbing layers are different, e.g. thicknesses of the layers, filling factors, matrix materials and metal material of the metal particles. These different characteristics lead to different optical properties of the absorbing layers.

The intermediate transmission dielectric layer has a transmission layer material with a dielectric layer material refractive index $n_d$ for the absorption radiation, which is selected from the range between 1.0 and 3.0, and a dielectric layer material extinction coefficient $k_d$ for the absorption radiation, which is selected from the range between 0.0 and 0.2. The thickness of this layer is about 20 nm. The transmission dielectric material is Aluminium Oxide.

Completed is the multilayer stack by an anti reflecting layer 19, which is averted to the substrate surface of the substrate. The thickness of this layer is about 60 nm. This layer consists of Silicon Oxide. Alternatively this layer consists of Aluminium Oxide.

For the manufacturing of the multilayer stack on the surface of the heat receiver tube a sputtering technique is carried out. Thereby for metal containing targets DC sputtering is used.

Figure 3:
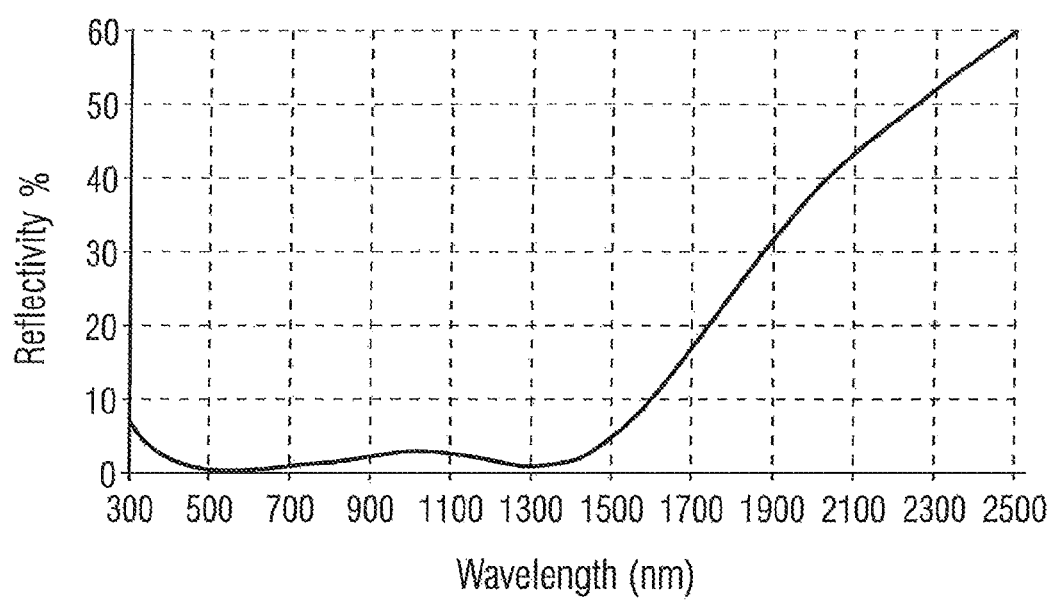
FIG. 3 shows an overall optical reflectivity of the of a solar energy adsorptive coating based on the first example.

In FIG. 3 the calculated wavelength dependency of the reflection of the solar energy absorptive coating can be seen.

Example 2

A further transmission dielectric layer 20 is attached on the second absorbing layer 18 such, that the second absorbing layer 18 is arranged between the transmission layer 17 and the further transmission layer 20. The further transmission layer has the same characteristics as the transmission layer 17. This means that the transmission dielectric layer materials are the same as well as the thicknesses of these layers.

Additionally a further absorbing layer 21 is attached to the further transmission dielectric layer 20 such, that the further transmission dielectric layer is arranged between the second absorbing layer 18 and the further absorbing layer 21. The further absorbing layer comprises a cermet, too. The characteristics of the further absorbing layer 21 are the same as the characteristics of the second absorbing layer 18. Concerning example 2 a "CDCDC" profile is implemented.

We claim:
1. An arrangement, comprising:
a solar energy absorptive coating arranged on a substrate surface of a substrate, the solar energy absorptive coating, comprising:
a multilayer stack, comprising the following stacking sequence:
a first absorbing layer with a first absorbing layer material for absorbing an absorption radiation of a certain spectrum of sunlight;
a transmission dielectric layer with a transmission dielectric layer material for a transmission of the absorption radiation; and
a second absorbing layer with a second absorbing layer material for absorbing the absorption radiation;
wherein at least one of the absorbing layer materials from the first absorbing layer or the second absorbing layer includes an absorbing layer material refractive index for the absorption radiation, which is selected from a first range between 1.5 and 4.0, and an absorbing layer material extinction coefficient for the absorption radiation, which is selected from a second range between 0.8 and 3.0,
wherein the transmission dielectric layer material includes a dielectric layer material refractive index for the absorption radiation, which is selected from a third range between 1.0 and 3.0, and a dielectric layer material extinction coefficient for the absorption radiation, which is selected from a fourth range between 0.0 and 0.2,
   wherein at least one of the absorbing layer materials from the first absorbing layer or the second absorbing layer includes a composite having a composite matrix with at least one dielectric matrix material and metal particles with at least one metal,
   wherein the metal particles are distributed in the composite matrix,
wherein one of the absorbing layers is directly attached to the substrate surface.

2. The arrangement according to claim 1,
wherein the substrate is part of a heat receiver tube of a power plant for converting solar energy into electrical energy, and
wherein the heat receiver tube carries a thermal liquid for absorbing energy from the sunlight.

* * * * *